United States Patent Office 2,833,809
Patented May 6, 1958

2,833,809

ACYCLIC, POLYNITRILE-CONTAINING, UNSATURATED COMPOUNDS AND PREPARATION THEREOF

William Joseph Middleton, Claymont, Del., assignor to E. I. du Pont de Nemours and Company, Wilmington, Del., a corporation of Delaware No Drawing. Application October 21, 1955
Serial No. 542,091

20 Claims. (Cl. 260—465.5)

This invention is concerned with a new class of strong, water-soluble, monohydric organic acids and their salts, and methods for preparing these compounds; and is more particularly concerned with the monohydric acids consisting of a class of 1,1,3,3-tetracyanopropenes having amino or halogeno substituents in the 2-position, salts of this class of acids, and preparation of the acids and their salts.

Several new 2-substituted-1,1,3,3-tetracyanopropene compounds and their preparation are disclosed and claimed in my copending U. S. patents, No. 2,766,243, No. 2,766,246 and No. 2,766,247, issued October 9, 1956.

It is an object of the present invention to provide a new class of 2-substituted-1,1,3,3-tetracyanopropene compounds which are of further interest in syntheses because of the different substituents in the 2-position and which, as monohydric acids, have properties particularly adapted to certain uses. Another object is to provide methods for preparing these compounds. Other objects will become apparent from the specification and claims.

In accordance with this invention a new class of related compounds has been discovered, the 2-substituted-1,1,3,3-tetracyanopropenes and salts thereof which are represented by the general formula

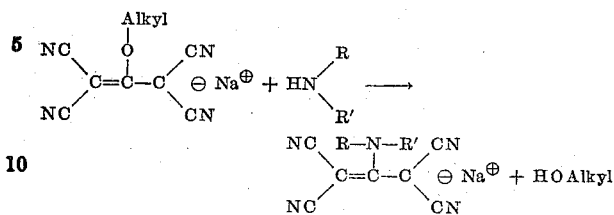

wherein X is halogen or an amino group (i. e.

where R and R' are hydrogen or hydrocarbon radicals of 1–18 carbon atoms which may be joined in the case of cyclic imines, e. g., piperidino and morpholino) and M is hydrogen or a salt-forming cation.

In the acid form of these compounds, the single proton associated with the tetracyanopropene chain (as distinguished from any hydrogen atom in the X substituent) is an acidic hydrogen which is highly ionized in water. Water solutions of these compounds are, therefore, acids in the classical sense and react readily with bases, such as oxides and hydroxides, to form salts. For convenience in naming these salts, the monovalent anion formed by removal of the proton from the 1-position will be referred to as the corresponding 2-(substituted)-1,1,3,3-tetracyanopropenide ion.

One method for preparing compounds of this invention is by reaction of a sodium 2-alkoxy-1,1,3,3-tetracyanopropenide with ammonia or a primary or secondary hydrocarbon amine (including cyclic imines) in accordance with the general reaction,

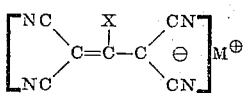

where R and R' are as previously defined. The reaction is preferably carried out in an inert liquid diluent at a mildly elevated temperature of the order of 50°–100° C., although temperatures from about 20° C. up to the boiling point of the diluent may be used and the diluent may be omitted, particularly when the amine is a liquid. The sodium 2-amino-1,1,3,3-tetracyanopropenide may be recovered as such or converted to the acid form or a less soluble salt by metathesis before recovery from the reaction mixture.

As an illustration of the simplicity of this method, when sodium 2-alkoxy-1,1,3,3-tetracyanopropenide is boiled in concentrated aqueous ammonium hydroxide there is produced an aqueous solution of sodium 2-amino-1,1,3,3-tetracyanopropenide. This salt is recovered as such by evaporation of the solution to dryness. Alternatively, a less soluble salt is prepared by metathesis, e. g., reaction of the aqueous sodium salt with N-methylquinolinium iodide precipitates N-methylquinolinium 2-amino-1,1,3,3-tetracyanopropenide. The free acid, 2-amino-1,1,3,3-tetracyanopropene, is obtained by bringing a solution of one of the cation salts into contact with an acidic ion-exchange resin to remove the cation.

Another method is to prepare the 2-amino-1,1,3,3-tetracyanopropene compounds directly, without isolation of intermediate compounds, by reaction of tetracyanoethylene with sodiomalononitrile and with ammonia or a primary or secondary hydrocarbon amine in the presence of an alcohol; as illustrated in Example III. The general reaction conditions are similar to the above except that anhydrous conditions are preferred to avoid side reactions with water.

The 2-halogeno-1,1,3,3-tetracyanopropene compounds are most readily prepared by diazotizing the amine group of a 2-amino-1,1,3,3-tetracyanopropenide salt with sodium nitrite in the presence of a hydrohalogen acid.

The starting materials for use in this invention are prepared as follows:

A. TETRACYANOETHYLENE

To a refluxing solution of 33 parts of malononitrile in 600 parts of chloroform, 70 parts of sulfur monochloride is added slowly over a period of six hours. The mixture is refluxed for 20 hours, and the chloroform is boiled off by heating on a steam bath. During the latter stages of this evaporation there is evidence of an exothermic reaction, and some crystalline material is deposited on the walls of the container. This deposit is combined with the residue from the evaporation and extracted exhaustively with diethyl ether in a Soxhlet extractor. The ether extract is evaporated to obtain 18 parts of crude tetracyanoethylene, which is purified by sublimation at 100° C. under reduced pressure (1–2 mm.).

B. SODIUM 2-ETHOXY-1,1,3,3-TETRACYANOPROPENIDE

Tetracyanoethylene is reacted with ethyl alcohol by dissolving 64 parts of tetracyanoethylene and 30 parts of urea (catalyst) in 395 parts of ethyl alcohol and heating the resulting solution at reflux until the initial deep purple color fades to a yellow. The solution is cooled and poured into 5000 parts of cold water. Dicyanoketene diethyl acetal (60 parts) separates as an oil which solidifies on standing. It is purified by recrystallization from a mixture of alcohol and water.

Dicyanoketene diethyl acetal (554 parts) is added to a solution of sodiomalononitrile prepared by dissolving 77 parts of sodium in 3946 parts of absolute ethyl alcohol and adding 220 parts of malononitrile. As the solid dissolves, the solution becomes warm. The white precipitate which forms upon cooling is collected on a filter, washed with ether, and recrystallized from alcohol. There is obtained 450 parts of the sodium salt of 2-ethoxy-1,1,3,3-tetracyanopropene in the form of white needles which melt above 300° C.

C. SODIUM 2-(β-HYDROXYETHOXY)-1,1,3,3-TETRACYANOPROPENIDE

A mixture of 64 parts of tetracyanoethylene, 10 parts of urea, and 134 parts of ethylene glycol is heated over a steam bath until the dark color which forms at first fades. The mixture is cooled and poured into 5000 parts of cold water. The precipitate is collected on a filter (64 parts, 94% yield) and recrystallized from alcohol-water after decolorizing with carbon-black. There is obtained 46.2 parts of dicyanoketene ethylene acetal in the form of white needles, M. P. 113–114° C.

A solution of 680 parts of dicyanoketene ethylene acetal (2-dicyanomethylene-1,3-dioxolane) in 1973 parts of hot ethyl alcohol is mixed with an alcoholic solution of sodiomalononitrile prepared from 330 parts of malononitrile and 115 parts of sodium in 1973 parts of ethyl alcohol. An exothermic reaction ensues and the reaction mixture is cooled in ice. A white precipitate forms as the reaction mixture is cooled. The precipitate is collected on a filter, washed with cold alcohol, and recrystallized from alcohol. There is obtained 850 parts of sodium 2-(β-hydroxyethoxy)-1,1,3,3-tetracyanopropenide in the form of white needles, M. P. ca. 300° C. with decomposition.

In the following examples which illustrate specific embodiments of the invention, parts are by weight:

*Example I.—N-methylquinolinium 2-amino-1,1,3,3-tetracyanopropenide*

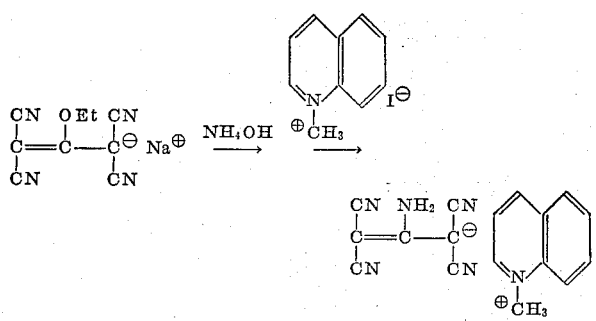

A solution of 5 parts of sodium 2-ethoxy-1,1,3,3-tetracyanopropenide in 45 parts of concentrated ammonium hydroxide is heated under reflux for 2 hours, cooled to 0° C., saturated with anhydrous ammonia, and again heated under reflux for 16 hours. The solution is cooled and filtered, and the filtrate is mixed with a solution of 10 parts of N-methylquinolinium iodide in 100 parts of water. The yellow precipitate which forms is collected on a filter, washed with water, and recrystallized from water. There is obtained 5 parts (70% yield) of light yellow prisms of N-methylquinolinium 2-amino-1,1,3,3-tetracyanopropenide, M. P. 180–181° C.

*Analysis.*—Calcd. for $C_{17}H_{12}N_6$: C, 67.98; H, 4.03; N, 27.99. Found: C, 68.02, 68.15; H, 4.07, 3.96; N, 28.11, 28.14.

The infrared absorption spectrum shows bands at 2.95 and 3.1 microns, indicating the presence of an amino group.

*Example II*

A solution of 50 parts of sodium 2-(β-hydroxyethoxy)-1,1,3,3-tetracyanopropene in 450 parts of concentrated ammonium hydroxide is heated under reflux for 2 hours, cooled to 10° C., saturated with anhydrous ammonia, and again heated under reflux for 16 hours. The solution is cooled and filtered, and the filtrate is mixed with 60 parts of N-methylquinolinium iodide in 200 parts of water. The yellow precipitate which forms is collected on a filter, washed with water, and dried. There is obtained 55 parts (82% yield) of N - methylquinolinium 2 - amino-1,1,3,3-tetracyanopropenide in the form of a yellow powder, M. P. 179–181° C. A sample is recrystallized from water to give yellow needles, M. P. 180–181° C.

*Example III*

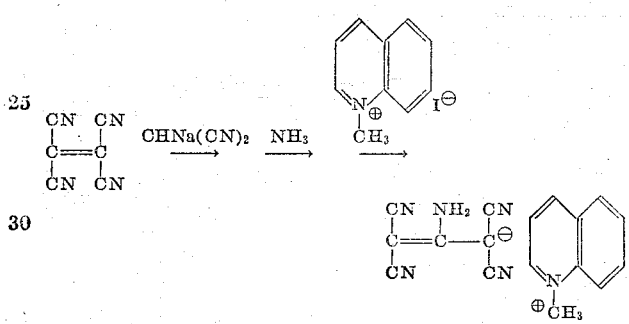

A mixture of 256 parts of resublimed tetracyanoethylene and 1975 parts of absolute alcohol is heated on a steam bath until most of the tetracyanoethylene dissolves. To this solution is added sodiomalononitrile prepared from 46 parts of sodium and 120 parts of malononitrile in 1580 parts of absolute ethanol. The solution is stirred for one hour, saturated with gaseous ammonia, and then allowed to stand for two days at room temperature. The solution is evaporated to near dryness in a draft of air, and the residue is treated with water. The insoluble portion is removed by filtration, and the filtrate is mixed with a solution of 542 parts of N-methylquinolinium iodide in 4000 parts of water. The yellow precipitate which forms is collected on a filter, washed with water, and recrystallized from water, using decolorizing carbon. There is obtained 180 parts (30% yield) of N-methylquinolinium 2-amino-1,1,3,3-tetracyanopropenide in the form of yellow prisms, M. P. 180–181° C.

*Analysis.*—Calcd. for $C_{17}H_{12}N_6$: C, 67.98; H, 4.03; N, 27.99. Found: C, 67.79; H, 4.01; N, 27.95.

*Example IV.—Tetraethylammonium 2 - amino-1,1,3,3-tetracyanopropenide*

A solution of 1000 parts of sodium 2-(β-hydroxyethoxy)-1,1,3,3-tetracyanopropenide in 9000 parts of concentrated ammonium hydroxide is heated under reflux for 2 hours, cooled to 10° C., saturated with anhydrous ammonia, and again heated under reflux for 16 hours. The solution is filtered hot and the filtrate is mixed with a solution of 1000 parts of tetraethylammonium bromide in 3000 parts of water. Long, white needles form upon cooling. These are collected on a filter and washed with water to give 931 parts (73% yield) of tetraethylammonium 2-amino-1,1,3,3-tetracyanopropenide, M. P. 137–140° C. A sample is recrystallized from water for analysis, M. P. 140–141° C.

*Analysis.*—Calcd. for $C_{15}H_{20}N_6$: C, 63.35; H, 7.90; N, 29.56. Found: C, 63.08; H, 7.25; N, 29.39, 29.35.

*Example V.—Silver 2-amino-1,1,3,3-tetracyanopropenide*

A solution of 50 parts of N-methylquinolinium 2- amino-1,1,3,3-tetracyanopropenide in 2500 parts of hot water is mixed with 104 parts of 5% silver nitrate solution. The white precipitate which forms is collected on a filter, washed with water and dried. There is obtained 43 parts of silver 2-amino-1,1,3,3-tetracyanopropenide in the form of a white powder, M. P. above 300° C.

*Analysis.*—Calcd. for $C_7H_2N_5Ag$: C, 31.84; H, 0.76; N, 26.53; Ag, 40.86. Found: C, 32.20; H, 0.84; N, 26.71; Ag, 40.43.

*Example VI.—Hydrated 2 - amino - 1,1,3,3-tetracyanopropene*

A solution of 50 parts of tetraethylammonium 2-aminotetracyanopropenide in 395 parts of acetone is passed through a column containing an ion-exchange resin in acid form ("Amberlite IR–120–H") which has been flushed with acetone to remove most of the water. The percolate is evaporated to dryness at room temperature. There is obtained 24 parts of a residue which consists of white needles covered with a light brown deposit. The analytical data correspond to 2-amino-1,1,3,3-tetracyanopropene dihydrate.

*Analysis.*—Calcd. for $C_7H_3N_7.2H_2O$: C, 43.52; H, 3.65; N, 36.26; N. Eq., 193. Found: C, 44.11; H, 3.12; N, 35.78; N. Eq., 207.

A similar sample of this material is prepared in the same manner from N-methylquinolinium iodide. It possesses a pKa of 2.58 in water.

The water in 2-amino-1,1,3,3-tetracyanopropene dihydrate is held by hydration, and is not chemically bound. This is demonstrated by the fact that the anhydrous N-methylquinolinium salt is recovered when an aqueous solution of the free acid is treated with N-methylquinolinium iodide.

*Example VII.—Pyridinium 2-amino-1,1,3,3-tetracyanopropenide*

A solution of 30 parts of N-methylquinolinium 2-amino-1,1,3,3-tetracyanopropenide in 2370 parts of acetone is passed through an aqueous ion-exchange column in acid form ("Amberlite IR–120–H") which has been flushed with acetone to remove most of the water. The percolate is evaporated to 150 ml., and pyridine is added slowly until the yellow solution becomes colorless. Ether is added to the solution, and the white precipitate which forms is collected on a filter, washed with ether, and recrystallized from alcohol. There is obtained 15 parts of pyridinium 2-amino-1,1,3,3-tetracyanopropenide in the form of white plates, M. P. 200–203° C.

*Analysis.*—Calcd. for $C_{12}H_8N_6$: C, 61.01; H, 3.41; N, 35.58. Found: C, 61.05; H, 3.33; N, 35.62.

The ultraviolet absorption spectrum of an ethanol solution of this product shows two peaks, one at 245 millimicrons (molecular extinction coefficient 11,300) and another at 310 millimicrons (molecular extinction coefficient 30,700).

*Example VIII.—Sodium 2 - methylamino - 1,1,3,3-tetracyanopropenide*

A solution of 100 parts of sodium 2 - (β - hydroxyethoxy)-1,1,3,3-tetracyanopropenide in 790 parts of alcohol is saturated with anhydrous methylamine and then heated to reflux for 2 hours. The clear solution becomes milky after about 30 minutes. The solution is cooled and the white prepicitate which forms is collected on a filter, washed with a little cold alcohol, and recrystallized from water. There is obtained 75 parts of sodium 2-methylamino-1,1,3,3-tetracyanopropenide in the form of white prisms, M. P. above 300° C.

*Analysis.*—Calcd. for $C_8H_4N_5Na$: C, 49.74; H, 2.09; N, 36.26; Na, 11.91. Found: C, 49.90; H, 2.11; N, 36.09, 36.53; Na, 11.97.

*Example IX*

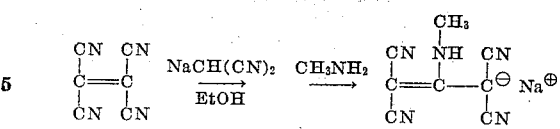

A mixture of 2840 parts of tetracyanoethylene and 19,750 parts of absolute alcohol is heated at reflux until most of the tetracyanoethylene dissolves. To this solution is added sodiomalononitrile prepared from 482 parts of sodium and 1400 parts of malononitrile in 15,800 parts of alcohol. The solution is stirred and then allowed to stand at room temperature for 18 hours, cooled to 10° C., saturated with anhydrous methylamine, and then heated to reflux for 5 hours. The solution is cooled and the light brown precipitate which forms is collected on a filter, washed with alcohol, and recrystallized from water, using decolorizing carbon. There is obtained 3000 parts (74% yield) of sodium 2-methylamino-1,1,3,3-tetracyanopropenide in the form of white prisms, M. P. above 300° C.

*Analysis.*—Calcd. for $C_8H_4N_5Na$: C, 49.74; H, 2.09; N, 36.26; Na, 11.91. Found: C, 49.80, 49.97; H, 2.16, 2.25; N, 36.28, 36.42; Na, 11.99.

*Example X.—N-methylquinolinium 2-methylamino-1,1, 3,3-tetracyanopropenide*

A solution of 5 parts of sodium 2-N-methylamino-1,1,3,3-tetracyanopropenide in 100 parts of water is mixed with a solution of 10 parts of N-methylquinolinium iodide in 100 parts of water. The mixture is cooled, and the light yellow precipitate which forms is collected on a filter, washed with water and recrystallized from water. There is obtained 5 parts of N-methylquinolinium 2-methylamino-1,1,3,3-tetracyanopropenide in the form of light yellow prisms, M. P. 129–130° C.

*Analysis.*—Calcd. for $C_{18}H_{14}N_6$: C, 68.80; H, 4.49; N, 26.73. Found: C, 69.08; H, 4.52; N, 26.82, 26.87.

*Example XI.—Sodium 2-dimethylamino-1,1,3,3-tetracyanopropenide*

A stirred mixture of 75 parts of sodium 2-(β-hydroxyethoxy)-1,1,3,3-tetracyanopropenide in 590 parts of alcohol and 340 parts of dimethylamine is heated under reflux for 2 hours and then allowed to cool in an ice-bath to 10° C. The white solid is collected on a filter, washed with water, and recrystallized from water. There is obtained 30 parts (44% yield) of sodium 2-dimethylamino-1,1,3,3-tetracyanopropenide in the form of a white crystalline powder, M. P. above 300° C.

*Analysis.*—Calcd. for $C_9H_6N_5Na$: C, 52.17; H, 2.92; N, 33.81; Na, 11.10. Found: C, 52.37; H, 3.02; N, 33.82; Na, 11.24.

*Example XII*

A saturated aqueous solution of sodium 2-dimethylamino-1,1,3,3-tetracyanopropenide is divided into three portions. The portions are mixed respectively with concentrated aqueous solutions of N-methylquinolinium iodide, quinoline hydrochloride, and tetramethylammonium chloride. Crystalline precipitates form in all three cases. The precipitates are collected by filtration and dried. The yellow N-methylquinolinium salt melts at 155–156° C.; the light yellow quinolinium salt melts at 195–196° C.; and the white tetramethylammonium salt melts at 202–203° C.

*Example XIII.—Salts of 2-methylamino-1,1,3,3-tetracyanopropene*

One volume of a saturated aqueous solution of sodium 2-methylamino-1,1,3,3-tetracyanopropenide is added to 5 volumes of a 10% aqueous solution of each of the salts indicated in the first column of Table I. The 2-methylamino-1,1,3,3-tetracyanopropenide which separates as a precipitate is indicated in the second column. The third column shows the color and form of the product.

TABLE I

| Aqueous Salt Solution (10% conc.) | 2-Methylamino-1,1,3,3-tetracyanopropenide Formed | Color and Form of 2-Methylamino-1,1,3,3-tetracyanopropenide |
| --- | --- | --- |
| Cobaltous acetate | Cobaltous | Orange crystals. |
| Trimethylphenylammonium chloride | Trimethylphenylammonium | White needles. |
| Lead acetate | Lead | White powder. |
| N-Methylquinolinium iodide | N-Methylquinolinium | Yellow powder. |
| Silver nitrate | Silver | White powder. |
| Cupric sulfate | Cupric | Brown powder. |
| Manganous chloride | Manganous | White powder. |
| Cadmium bromide | Cadmium | Do. |
| Tetraethylammonium bromide | Tetraethylammonium | White crystals. |
| Nickelous nitrate | Nickelous | Blue crystals. |
| Zinc acetate | Zinc | White powder. |

*Example XIV.—Salts of 2-dimethylamino-1,1,3,3-tetracyanopropene*

One volume of a saturated aqueous solution of sodium 2-dimethylamino-1,1,3,3-tetracyanopropenide is added to 5 volumes of an aqueous solution of each of the salts indicated in the first column of Table II. The 2-dimethylamino-1,1,3,3-tetracyanopropenide which separates as a precipitate is indicated in the second column. The third column shows the color and form of the product.

TABLE II

| Aqueous Salt Solution (10% conc. except where otherwise indicated) | 2-Dimethylamino-1,1,3,3-tetracyanopropenide Formed | Color and Form of 2-Dimethylamino-1,1,3,3,-tetracyanopropenide |
| --- | --- | --- |
| Cobaltous acetate | Cobaltous | Yellow crystals. |
| Lead acetate | Lead | White powder. |
| N-Methylquinolinium iodide | N-Methylquinolinium | Yellow crystals. |
| Calcium nitrate (saturated) | Calcium | White needles. |
| Silver nitrate | Silver | White powder. |
| Cerous nitrate | Cerous | White needles. |
| Cupric sulfate | Cupric | Brown powder. |
| Mercuric chloride | Mercuric | White powder. |
| Manganous chloride | Manganous | Do. |
| Cadmium bromide | Cadmium | Do. |
| Nickelous nitrate | Nickelous | Blue powder. |
| Zinc acetate | Zinc | White powder. |

*Example XV.—N-methylquinolinium 2-bromo-1,1,3,3-tetracyanopropenide*

A solution of 250 parts of sodium nitrate in 1000 parts of water is added slowly to a hot solution of 250 parts of N-methylquinolinium 2-amino-1,1,3,3-tetracyanopropenide in 5000 parts of water and 745 parts of concentrated (48%) hydrobromic acid. Long, straw-colored needles precipitate before the addition is complete. The mixture is cooled after the evolution of gas ceases, and the precipitate is collected on a filter and washed with water and dried. There is obtained 275 parts (90% yield) of N-methylquinolinium 2-bromo-1,1,3,3-tetracyanopropenide in the form of straw-colored needles, M. P. 170–171° C. A sample is recrystallized from water for analysis, M. P. 170–171° C.

*Analysis.*—Calcd. for $C_{17}H_{10}N_5Br$: C, 56.06; H, 2.77; N, 19.23; Br, 21.94. Found: C, 56.05, 56.38; H, 2.95, 3.12; N, 19.20, 18.98; Br, 21.93.

*Example XVI.—Tetraethylammonium 2-bromo-1,1,3,3-tetracyanopropenide*

To a hot solution of 30 parts of tetraethylammonium 2-amino-1,1,3,3-tetracyanopropenide in 250 parts of water and 89 parts of 48% hydrobromic acid is added slowly with stirring a solution of 30 parts of sodium nitrite in 100 parts of water. Hot water (500 parts) is added to the reaction mixture to bring the oil which separates into solution, and the solution is boiled with decolorizing carbon-black for 10 minutes and filtered. The solution is cooled, and the orange needles which separate are collected on a filter, washed with water, and recrystallized from water. There is obtained 21 parts of tetraethylammonium 2-bromo-1,1,3,3-tetracyanopropenide in the form of orange needles, M. P. 104–107° C.

*Analysis.*—Calcd. for $C_{15}H_{20}N_5Br$: C, 51.43; H, 5.76; N, 20.00; Br, 22.82. Found: C, 51.15, 51.42; H, 5.88, 5.97; N, 19.70; Br, 22.49.

*Example XVII.—Silver 2-bromo-1,1,3,3-tetracyanopropenide*

A solution of 100 parts of N-methylquinolinium 2-bromo-1,1,3,3-tetracyanopropenide in 1580 parts of acetone is mixed rapidly with a solution of 100 parts of silver nitrate in 1000 parts of water. The white precipitate which forms is collected on a filter, washed with water and then acetone. The solid is dissolved in a minimum quantity of acetonitrile, filtered, and the filtrate diluted with 2 volumes of water. The mixture is heated until all solid dissolves and then cooled. The needles which form are collected on a filter and washed with water. There is obtained 81 parts of silver 2-bromo-1,1,3,3-tetracyanopropenide in the form of long, cream-colored needles, M. P. above 300° C.

*Analysis.*—Calcd. for $C_7N_4BrAg$: C, 25.64; N, 17.09; Br, 24.37; Ag, 32.90. Found: C, 25.46; H, 0.34; N, 17.07; Br, 23.58; Ag, 33.34.

*Example XVIII.—2-bromo-1,1,3,3-tetracyanopropene*

A solution of 50 parts of N-methylquinolinium 2-bromo-1,1,3,3-tetracyanopropenide in 790 parts of acetone is passed through a column containing an acidic ion-exchange resin ("Amberlite IR–120–H") which has been flushed with acetone to remove most of the water. The percolate is evaporated to dryness. There is obtained 33 parts of a light tan crystalline solid; M. P. 70–100° C. The analysis indicates the 2-bromo-1,1,3,3-tetracyanopropene thus obtained is hydrated with 2½ $H_2O$.

*Analysis.*—Calcd. for $C_7HN_4Br \cdot 2½ H_2O$: C, 31.60; H, 2.27; N, 21.05; Br, 30.04; N. Eq., 266. Found: C, 31.70; H, 2.57; N, 20.75; Br, 29.78; N. Eq., 260; pKa=2.60 in water.

*Example XIX.—Pyridinium 2-bromo-1,1,3,3-tetracyanopropenide*

To a solution of 10 parts of 2-bromo-1,1,3,3-tetracyanopropene·2½ $H_2O$ in 500 parts of water is added 15 parts of pyridine. The white precipitate which forms is collected on a filter, washed with water and recrystallized from water. There is obtained 10 parts of pyridinium 2-bromo-1,1,3,3-tetracyanopropenide in the form of matted white needles, M. P. 180–181° C.

*Analysis.*—Calcd. for $C_{12}H_6N_5Br$: C, 48.02; H, 2.02; N, 23.34; Br, 26.63. Found: C, 48.32; H, 2.13; N, 23.12; Br, 26.39.

*Example XX.—Barium 2-bromo-1,1,3,3-tetracyanopropenide*

A solution of 50 parts of N-methylquinolinium 2-bromo-1,1,3,3-tetracyanopropenide in 790 parts of acetone is passed through an acidic ion-exchange column ("Amberlite IR–120–H") which has been flushed with acetone to remove most of the water. The percolate is evaporated to near dryness, and then mixed with 546 parts of 10% aqueous barium chloride solution. The precipitate which forms is collected on a filter, washed with a little cold water, and recrystallized from water. There is obtained 31 parts of barium 2-bromo-1,1,3,3-tetracyanopropenide in the form of cream-colored needles, M. P. above 300° C.

*Analysis.*—Calcd. for $BaC_{14}N_8Br_2 \cdot 4H_2O$: C, 25.89; N, 17.25; Br, 24.61; Ba, 21.15. Found: C, 26.03; H, 1.52; N, 17.28; Br, 24.67; Ba, 20.65.

Example XXI.—N-methylquinolinium 2-chloro-1,1,3,3-tetracyanopropenide

A solution of 50 parts of sodium nitrite in 250 parts of water is added slowly to a boiling solution of 30 parts of N - methylquinolinium 2 - amino-1,1,3,3-tetracyanopropenide in 500 parts of water and 118 parts of 36% hydrochloric acid. When the evolution of gas ceases, the solution is cooled, and the precipitate is collected on a filter and recrystallized from water. There is obtained 20 parts of N-methylquinolinium 2-chloro-1,1,3,3-tetracyanopropenide in the form of straw-colored plates, M. P. 136–138° C.

*Analysis.*—Calcd. for $C_{17}H_{10}N_5Cl$: C, 63.85; H, 3.15; N, 21.91; Cl, 11.09. Found: C, 63.79, 63.90; H, 3.14, 3.23; N, 21.96, 22.02; Cl, 10.99.

Example XXII.—Tetraethylammonium 2-chloro-1,1,3,3-tetracyanopropenide

To a solution of 142 parts of tetraethylammonium 2-amino-1,1,3,3-tetracyanopropenide in 5000 parts of warm water and 296 parts of 36% hydrochloric acid is added slowly with stirring a solution of 69 parts of sodium nitrite in 250 parts of water. The solution is heated to boiling, treated with decolorizing carbon and filtered while hot. The precipitate which forms when the filtrate is cooled is collected on a filter, washed with water and dried (102 parts, 67% crude yield). This material is recrystallized from water to give 63 parts of tetraethylammonium 2-chloro-1,1,3,3-tetracyanopropenide in the form of orange needles, M. P. 180–181° C.

*Analysis.*—Calcd. for $C_{15}H_{20}N_5Cl$: C, 58.91; H, 6.59; N, 22.90; Cl, 11.60. Found: C, 59.17, 59.33; H, 6.63, 6.76; N, 22.54, 22.22; Cl, 11.30.

The ultraviolet absorption spectrum of an acetone solution of this product shows a peak at 356 millimicrons (molecular extinction coefficient 31,800).

Example XXIII.—Tetramethylammonium 2-chloro-1,1,3,3-tetracyanopropenide

A solution of 50 parts of N-methylquinolinium 2-amino-1,1,3,3-tetracyanopropenide in 500 parts of hot water is passed through an acidic ion-exchange column ("Amberlite IR–120–H"). The percolate is cooled to 0° C., and 118 parts of 36% hydrochloric acid and then a solution of 50 parts of sodium nitrite in 250 parts of water is added. A deep purple color develops, and a purple solid precipitates. This material is collected on a filter and washed with water. This material apparently contains sodium, for a basic white residue is obtained upon ignition of a small sample. The remainder of the solid is dissolved in water to give a purple solution, and then boiled for 5 minutes until the color fades to light blue. A solution of 30 parts of tetramethylammonium chloride in 100 parts of water is added, and the precipitate which forms is collected on a filter, washed with water, and recrystallized from water. There is obtained 12 parts of tetramethylammonium 2-chloro-1,1,3,3-tetracyanopropenide in the form of long white needles, M. P. 211–213° C.

*Analysis.*—Calcd. for $C_{11}H_{12}N_5Cl$: C, 52.91; H, 4.85; N, 28.05; Cl, 13.77. Found: C, 52.95, 52.76; H, 5.04, 5.20; N, 28.28, 27.99; Cl, 14.20.

The ultraviolet absorption spectrum of an acetone solution of this product shows a peak at 355 millimicrons (molecular extinction coefficient 32,000).

Other embodiments of this invention are summarized in Table III below. When the 2-(substituted)-1,1,3,3-tetracyanopropenes indicated in the first column of Table III are used in place of sodium 2-(β-hydroxyethoxy)-1,1,3,3-tetracyanopropenide in Example XVII and the amines indicated in the second column of Table III are substituted for methylamine in Example XVII, the respective 2-amino-1,1,3,3-tetracyanopropenes indicated in the third column of Table III are obtained. The preparation of the 2-(substituted)-1,1,3,3-tetracyanopropene starting materials in the first column of Table III is described in my U. S. Patent No. 2,766,247, issued October 9, 1956.

TABLE III

| 2-(Substituted)-1,1,3,3-tetracyanopropene Starting Compound | Amine | 2-Amino-1,1,3,3-tetracyanopropene Product |
|---|---|---|
| sodium 2-methoxy-1,1,3,3-tetracyanopropenide. | stearylamine | sodium 2-stearylamino-1,1,3,3-tetracyanopropenide. |
| sodium 2-n-octadecyloxy-1,1,3,3-tetracyanopropenide. | aniline | sodium 2-anilino-1,1,3,3-tetracyanopropenide. |
| sodium 2-allyloxy-1,1,3,3-tetracyanopropenide. | cyclohexylamine. | sodium 2-cyclohexylamino-1,1,3,3-tetracyanopropenide. |
| sodium 2-(3-hydroxypropoxy)-1,1,3,3-tetracyanopropenide. | piperidine | sodium 2-piperidino-1,1,3,3-tetracyanopropenide. |
| sodium 2-ethoxy-1,1,3,3-tetracyanopropenide. | N-methyl-naphthylamine. | sodium 2-N-methylnaphthylamino-1,1,3,3-tetracyanopropenide. |
| sodium 2-(β-hydroxyethoxy)-1,1,3,3-tetracyanopropenide. | di-n-butylamine. | sodium 2-(di-n-butylamino)-1,1,3,3-tetracyanopropenide. |
| sodium 2-ethoxy-1,1,3,3-tetracyanopropenide. | morpholine | sodium 2-morpholino-1,1,3,3-tetracyanopropenide. |

The several salts of the 2-(substituted)-1,1,3,3-tetracyanopropenes of the present invention are readily prepared from the free acids. Isolation of the desired salt is facilitated if an aqueous solution of the barium salt is treated with a sulfate. Barium sulfate precipitates quantitatively, leaving an aqueous solution of the desired salt, which is recovered by evaporation. Thus an aqueous solution of the free acid, 2-amino-1,1,3,3-tetracyanopropene (Example VI) or 2-bromo-1,1,3,3-tetracyanopropene (Example XVII), is exactly neutralized with an equivalent quantity of barium hydroxide or barium carbonate to yield an aqueous solution of barium 2-amino-1,1,3,3-tetracyanopropenide or barium 2-bromo-1,1,3,3-tetracyanopropenide. This solution of the barium compound reacts with aqueous solutions of the sulfates of Al, Ce, Cs, $Cr^{++}$, $Cr^{+++}$, $Co^{++}$, $Co^{+++}$, $Cu^{++}$, $Fe^{++}$, $Fe^{+++}$, Ga, In, $Ni^{++}$, Li K, $Mn^{++}$, Rb, $Sn^{++}$, $Sn^{++++}$, Th, $UO_2$, VO, Zn, Zr, $NH_4^+$, $C_6H_5NH_3^+$, $(C_2H_5)_2NH_2^+$, $(CH_3)_3NH^+$ and $(CH_3)_3S^+$ to yield the corresponding metal, amine or sulfonium salts of 2-amino-1,1,3,3-tetracyanopropene or 2-bromo-1,1,3,3-tetracyanopropene.

In carrying out the reaction of a 2-alkoxy-1,1,3,3-tetracyanopropene with an amine according to this invention, the use of a liquid reaction medium represents a preferred mode of procedure, but is not an essential requirement. For example, when the amine is a liquid, the 2-alkoxy-1,1,3,3-tetracyanopropene may be dissolved directly therein. Thus 2-ethoxy-1,1,3,3-tetracyanopropene is dissolved in piperidine and the solution is heated gently at 75° C. with stirring for several hours. Care must be taken to avoid overheating and a resulting violent reaction. The ethanol produced as a by-product and excess piperidine are removed by evaporation, leaving 2-piperidino-1,1,3,3-tetracyanopropene as a residue.

However, it is preferred to carry out the reaction in the presence of a liquid diluent to insure good contact of the reactants and to provide for dissipation of the heat of reaction. Water and alcohols are the preferred media, but other organic liquids inert to the reactants, such as ethers, hydrocarbons and the like, may be employed. The reaction will take place at room temperature if sufficient time is allowed, but for practical purposes it is preferred to operate at temperatures in the range of 50–100° C. or above. Higher temperatures may be employed by working in a closed system under autogenous pressure, but there is no advantage to such a procedure. Pressure is not a critical factor in the reaction.

In preparing 2-amino-1,1,3,3-tetracyanopropenes and their salts directly from tetracyanoethylene, sodiomalononitrile and an amine in the presence of an alcohol, it is preferred that the system be substantially free from water in order to avoid loss of tetracyanoethylene in a side reaction with water. In this process, also, it is preferred to operate at 50–100° C. or above, and pressure is not critical. The preferred alcohols are methanol, ethanol, butanol, ethylene glycol and the like.

The products of this invention are all useful as precipitating agents for rosaniline type dyes (rosaniline, crystal violet and the like) in preparing pigments for printing ink. For example, the addition of 2-amino-1,1,3,3-tetracyanopropene or 2-dimethylamino-1,1,3,3-tetracyanopropene or 2-bromo-1,1,3,3-tetracyanopropene to an aqueous solution of rosaniline hydrochloride forms a flocculent purplish black precipitate. In each case the precipitate is separated by filtration and dried to yield a deep purplish black pigment. This pigment is ground in mineral oil or a drying oil to produce a printing ink.

Many of the compounds of the present invention are useful as fluorescent pigments in fluorescent glow sheets for illuminated dials, charts and the like since they become luminescent when exposed to ultraviolet light. This is illustrated in Table IV.

TABLE IV

[Luminescence produced by ultraviolet light.]

| Compound | Luminescence under Ultraviolet Light of 3650 Å. |
| --- | --- |
| pyridinium 2-amino-1,1,3,3-tetracyanopropenide | blue. |
| N-methylquinolinium 2-amino-1,1,3,3-tetracyanopropenide. | yellow. |
| cadmium 2-methylamino-1,1,3,3-tetracyanopropenide | orange. |
| cobaltous 2-dimethylamino-1,1,3,3-tetracyanopropenide | red. |
| zinc 2-dimethylamino-1,1,3,3-tetracyanopropenide | blue. |
| cadmium 2-dimethylamino-1,1,3,3-tetracyanopropenide. | blue. |
| nickelous 2-dimethylamino-1,1,3,3-tetracyanopropenide. | greenish blue. |

To use these compounds as fluorescent pigments, they may be embedded in powder form in a transparent thermoplastic sheet, portions of which are cut and in turn embedded in the face of a supporting thermoplastic base to produce a pattern which will be sharply visible when the surface of the composite is illuminated with ultraviolet light. Preparation of composite glow sheets of this type is shown in U. S. Patent 2,340,227, issued January 25, 1944, to A. R. Russell.

Since many different embodiments of the invention may be made without departing from the spirit and scope thereof, it is to be understood that the invention is not limited by the specific illustrations except to the extent defined in the following claims.

What is claimed is:

1. A compound represented by the formula,

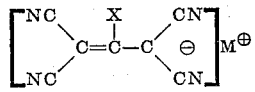

wherein X is selected from the group consisting of —Cl, —Br, piperidino, morpholino, —NH$_2$, —NHR and —NRR', wherein R and R' are hydrocarbon radicals of 1 to 18 carbon atoms, and M is selected from the group consisting of hydrogen and salt-forming cations.

2. A compound as defined in claim 1 wherein X is —Br.

3. A compound as defined in claim 1 wherein X is —NH$_2$.

4. A compound as defined in claim 1 wherein X is —NHR, R being a hydrocarbon radical of 1–18 carbon atoms.

5. A compound as defined in claim 1 wherein X is $$-N\diagdown_{R'}^{R}$$

R and R' being hydrocarbon radicals of 1 to 18 carbon atoms.

6. A compound as defined in claim 1 wherein X is —Cl.

7. A compound as defined in claim 1 wherein M is hydrogen.

8. A compound as defined in claim 1 wherein M is a salt-forming cation.

9. A compound as defined in claim 1 wherein M is a monovalent metal.

10. A compound as defined in claim 1 wherein M is a divalent metal.

11. A compound as defined in claim 1 wherein M is an amine.

12. A compound as defined in claim 1 wherein M is a quaternary amine.

13. The process for preparing a 2-amino-1,1,3,3-tetracyanopropene which comprises reacting tetracyanoethylene with sodiomalononitrile and with a reactant selected from the group consisting of ammonia and primary and secondary hydrocarbon amines of up to 18 carbon atoms in the presence of anhydrous alcohol.

14. The process for preparing a 2-amino-1,1,3,3-tetracyanopropene which comprises reacting a 2-(lower alkoxy)-1,1,3,3-tetracyanopropene with a reactant selected from the group consisting of ammonia and primary and secondary hydrocarbon amines of up to 18 carbon atoms.

15. A process as defined in claim 14 wherein the reaction is conducted in the presence of an inert liquid diluent at a temperature from about 20° C. up to the boiling point of the diluent.

16. A process as defined in claim 15 wherein the reaction is conducted at a temperature of 50°–100° C.

17. The process which comprises heating sodium 2-(lower alkoxy)-1,1,3,3-tetracyanopropenide in aqueous ammonium hydroxide until an aqueous solution of sodium 2-amino-1,1,3,3-tetracyanopropenide is produced.

18. The process which comprises heating sodium 2-(lower alkoxy)-1,1,3,3-tetracyanopropenide in aqueous ammonium hydroxide until an aqueous solution of sodium 2-amino-1,1,3,3-tetracyanopropenide is produced and precipitating a 2-amino-1,1,3,3-tetracyanopropenide by converting the sodium salt to a less soluble salt by metathesis.

19. The process which comprises heating sodium 2-(lower alkoxy)-1,1,3,3-tetracyanopropenide in aqueous ammonium hydroxide until an aqueous solution of sodium 2-amino-1,1,3,3-tetracyanopropenide is produced, bringing a solution of the 2-amino-1,1,3,3-tetracyanopropenide into contact with an acid ion-exchange resin to produce 2-amino-1,1,3,3-tetracyanopropene in acid form, and recovering the acid as a solid.

20. The process which comprises heating sodium 2-(lower alkoxy)-1,1,3,3-tetracyanopropenide in aqueous ammonium hydroxide until an aqueous solution of sodium 2-amino-1,1,3,3-tetracyanopropenide is produced and diazotizing the amine group of the 2-amino-1,1,3,3-tetracyanopropenide in the presence of a hydrohalogen acid selected from the group consisting of HBr and HCl to produce the corresponding 2-halogeno-1,1,3,3-tetracyanopropene.

References Cited in the file of this patent

Urishibara et al.: Chemical Abstracts, vol. 31, col. 1681 (1937).

Simons: Industrial and Engineering Chemistry, vol. 39, p. 238 (1947).

UNITED STATES PATENT OFFICE

CERTIFICATE OF CORRECTION

Patent No. 2,833,809                                                    May 6, 1958

William Joseph Middleton

It is hereby certified that error appears in the printed specification of the above numbered patent requiring correction and that the said Letters Patent should read as corrected below.

Column 3, lines 43 and 44, for "mebodiments" read -- embodiments --; column 7, line 50, for "nitrate" read -- nitrite --; line 65, for "Br, 21.93" read -- Br, 21.83 --; column 9, lines 72 and 74, for "Example XVII", each occurrence, read -- Example VIII --; column 10, lines 37 and 38, for "(Example XVII)" read -- (Example XVIII) --.

Signed and sealed this 24th day of March 1959.

(SEAL)
Attest:

KARL H. AXLINE                                                        ROBERT C. WATSON
Attesting Officer                                            Commissioner of Patents